US011682413B2

(12) United States Patent
Machado et al.

(10) Patent No.: US 11,682,413 B2
(45) Date of Patent: Jun. 20, 2023

(54) METHOD AND SYSTEM TO MODIFY SPEECH IMPAIRED MESSAGES UTILIZING NEURAL NETWORK AUDIO FILTERS

(71) Applicant: LENOVO (SINGAPORE) PTE. LTD, New Tech Park (SG)

(72) Inventors: Rafael Machado, Sorocaba (BR); Jampierre Vieira Rocha, Turmalina (BR)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 0 days.

(21) Appl. No.: 17/452,704

(22) Filed: Oct. 28, 2021

(65) Prior Publication Data
US 2023/0136822 A1  May 4, 2023

(51) Int. Cl.
*G10L 25/30* (2013.01)
*G10L 15/04* (2013.01)
*G10L 21/0216* (2013.01)
*G10L 15/02* (2006.01)

(52) U.S. Cl.
CPC ............ *G10L 25/30* (2013.01); *G10L 15/02* (2013.01); *G10L 15/04* (2013.01); *G10L 21/0216* (2013.01); *G10L 2021/02163* (2013.01)

(58) Field of Classification Search
CPC ................................. G10L 25/30; G10L 15/04
See application file for complete search history.

(56) References Cited

U.S. PATENT DOCUMENTS

2015/0011842 A1* 1/2015 Steinberg-Shapira ...................... A61B 5/4836 600/23
2019/0130897 A1* 5/2019 Zhou ..................... G06N 7/01
2021/0272551 A1* 9/2021 Yoo ....................... G10L 15/02

OTHER PUBLICATIONS

Dash, A., Subramani, N., Manjunath, T., Yaragarala, V., & Tripathi, S. (Sep. 2018). Speech recognition and correction of a stuttered speech. In 2018 International Conference on Advances in Computing, Communications and Informatics (ICACCI) (pp. 1757-1760). IEEE.*
Mishra, N., Gupta, A., & Vathana, D. (2021). Optimization of stammering in speech recognition applications. International Journal of Speech Technology, 24(3), 679-685.*

* cited by examiner

*Primary Examiner* — Bryan S Blankenagel
(74) *Attorney, Agent, or Firm* — The Small Patent Law Group LLC; Dean D. Small

(57) ABSTRACT

A computer implemented method, system and computer program product are provided that implement a neural network (NN) audio filter. The method, system and computer program product obtain an electronic audio signal comprising a speech impaired message and apply the audio signal to the NN audio filter to modify the speech impaired message to form an unimpaired message. The method, system and computer program product output the unimpaired message.

20 Claims, 5 Drawing Sheets

METHOD AND SYSTEM TO MODIFY SPEECH IMPAIRED MESSAGES UTILIZING NEURAL NETWORK AUDIO FILTERS

BACKGROUND

Embodiments of the present disclosure generally relate to modifying audio signals to correct speech impaired messages.

Today, people are increasingly relying upon software-based technologies for remote communication, such as in connection with business, academic and personal communications between individuals at various locations around the world. Electronic devices (e.g., cellular phones, tablet devices, laptop computers) and computer systems utilized numerous types of software communication platforms to provide audio/video conferencing.

However, a challenge remains for individuals, who have speech impairments, to utilize these communications platforms for audio communication.

A need remains for a practical solution to assist individuals with speech impairments who desire to talk to remote individuals through an audio network.

SUMMARY

In accordance with embodiments herein, a method is provided to be implemented by a system including memory configured to store program instructions and a neural network (NN) audio filter, the system further including one or more processors configured to execute the program instructions. The method comprises obtaining, at the system, an electronic audio signal comprising a speech impaired message; under direction of the one or more processors executing the program instructions, applying the audio signal to the NN audio filter to modify the speech impaired message and form an unimpaired message; and outputting the unimpaired message.

Additionally, or alternatively, the applying further comprises identifying an impaired section of the speech impaired message, the impaired section comprising sounds or words that are at least one of distorted or repeated; and removing the impaired section to form the unimpaired message. Additionally, or alternatively, the method further comprises identifying, as the impaired section, a sequence of repetitive sounds or words, the sequence of repetitive sounds or words removed to form the unimpaired message. Additionally, or alternatively, the applying the NN audio filter further comprises: segmenting the audio signal into segments corresponding to time steps; grouping the segments into first and second labels across corresponding first and second collections of the time steps; comparing first and second labels to identify repetition; and in connection with identifying repetition, removing the segments corresponding to one of the first and second labels. Additionally, or alternatively, the obtaining includes recording the speech impaired message at a microphone of the electronic device, and wherein the NN audio filter performs the segmenting, grouping, comparing and removing operations in real time while recording the speech impaired message. Additionally, or alternatively, the applying the NN audio filter further comprises utilizing a connectionist temporal classification (CTC) to identify an impaired section of the speech impaired message and remove the impaired section to form the unimpaired message. Additionally, or alternatively, the NN audio filter comprises a convolutional neural network (CNN) that communicates with a recurrent neural network (RNN) that communicates with a connectionist temporal classification (CTC). Additionally, or alternatively, the method further comprises utilizing feature detectors to extract one or more features of interest (FOIs) from segments of the audio signal, identifying word sub-units from the segments, grouping the word sub-units into labels, comparing the labels to identify one or more impaired sections, and removing the word sub-units corresponding to the one or more impaired sections to form the unimpaired message.

In accordance with embodiments herein, a system is provided that comprises: a user interface; memory configured to store program instructions and a neural network (NN) audio filter; and one or more processors that, when executing the program instructions, are configured to: obtain, at the electronic device, an electronic audio signal comprising a speech impaired message; apply the audio signal to the NN audio filter to modify the speech impaired message and form an unimpaired message; and output the unimpaired message.

Additionally, or alternatively, the one or more processors are further configured to identify an impaired section of the speech impaired message, the impaired section comprising sounds or words that are at least one of distorted or repeated, the one or more processors configured to remove the impaired section to form the unimpaired message. Additionally, or alternatively, the one or more processors are further configured to identify, as the impaired section, a sequence of repetitive sounds or words and remove the sequence of repetitive sounds or words to form the unimpaired message. Additionally, or alternatively, the one or more processors are further configured to apply the NN audio filter by: segmenting the audio signal into segments corresponding to time steps; grouping the segments into first and second labels across corresponding first and second collections of the time steps; comparing first and second labels to identify repetition; and in connection with identifying repetition, removing the segments corresponding to one of the first and second labels.

Additionally, or alternatively, the system further comprises a portable handheld device that includes the user interface, memory, one or more processors and a microphone, the microphone configured to record the speech impaired message, the one or more processors of the handheld device configured to apply the NN audio filter to performs the segmenting, grouping, comparing and removing operations in real time while the microphone records the speech impaired message. Additionally, or alternatively, the NN audio filter further comprises a connectionist temporal classification (CTC), the one or more processors configured to utilize the CTC to identify an impaired section of the speech impaired message and remove the impaired section to form the unimpaired message. Additionally, or alternatively, the one or more processors, when applying the audio signal to the NN audio filter, are further configured to: utilize feature detectors to extract one or more features of interest (FOIs) from segments of the audio signal; identify word sub-units from the segments; group the word sub-units into labels; compare the labels to identify one or more impaired sections; and remove the word sub-units corresponding to the one or more impaired sections to form the unimpaired message.

Additionally, or alternatively, the one or more processors are further configured to output the unimpaired message by at least one of: i) replaying the unimpaired message over an audio speaker, ii) transmitting the unimpaired message wired or wirelessly over a network, iii) presenting the unimpaired message on a display as an um-impaired text message, iv) recording the unimpaired message in the memory on a local electronic device or a remote resource.

In accordance with embodiments herein, a computer program product is provided comprising a non-signal computer readable storage medium comprising computer executable code to perform: obtaining an electronic audio signal comprising a speech impaired message; applying the audio signal to a neural network (NN) audio filter to modify the speech impaired message and form an unimpaired message; and outputting the unimpaired message. Additionally, or alternatively, the computer executable code applies the NN audio filter by: identifying an impaired section of the speech impaired message, the impaired section comprising sounds or words that are at least one of distorted or repeated; and removing the impaired section to form the unimpaired message. Additionally, or alternatively, the computer executable code applies the NN audio filter by: segmenting the audio signal into segments corresponding to time steps; grouping the segments into first and second labels across corresponding first and second collections of the time steps; comparing first and second labels to identify repetition; and in connection with identifying repetition, removing the segments corresponding to one of the first and second labels. Additionally, or alternatively, the NN audio filter comprises a convolutional neural network (CNN) that communicates with a recurrent neural network (RNN) that communicates with a connectionist temporal classification (CTC).

DETAILED DESCRIPTION

Figure 1A:
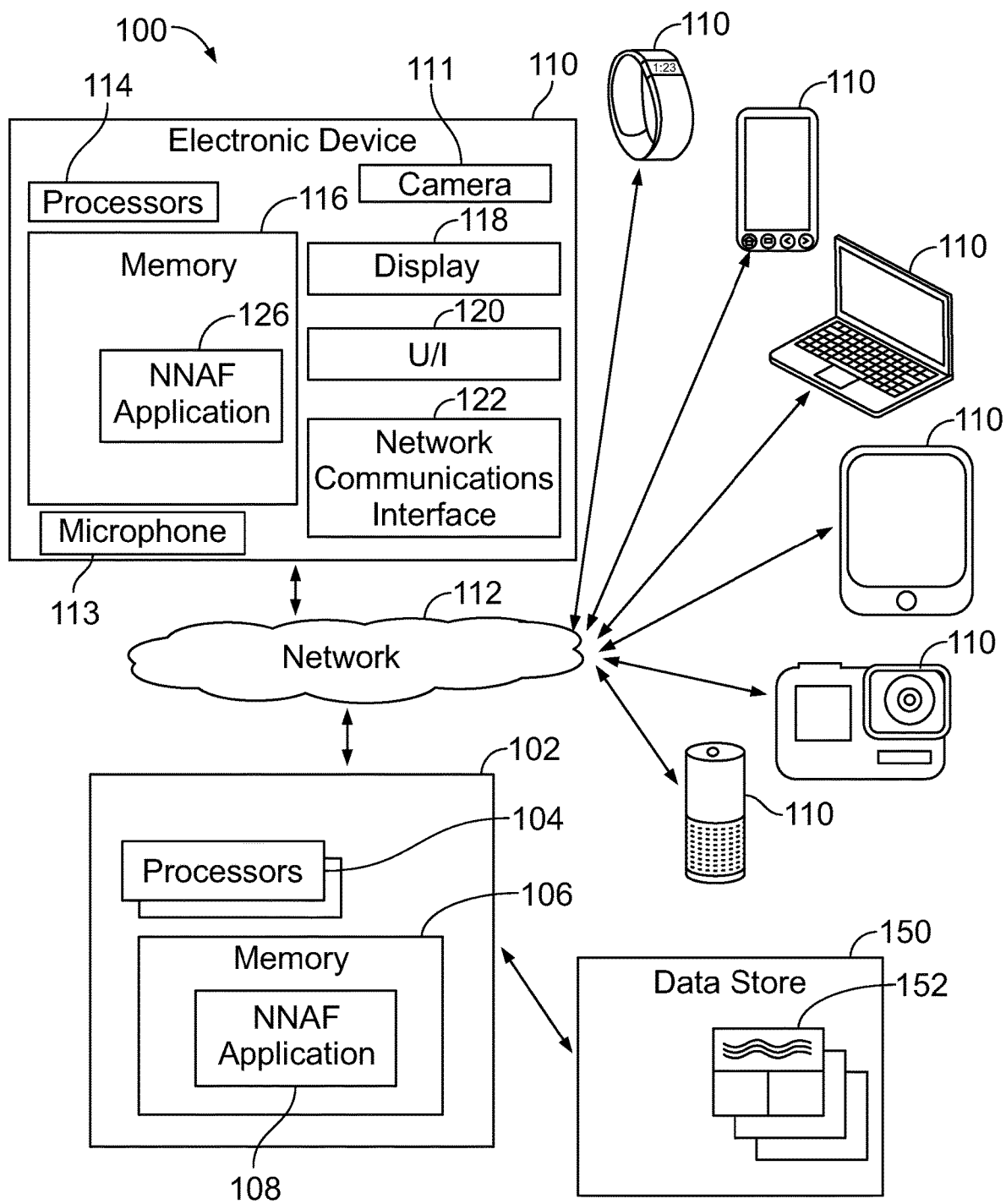
FIG. 1A illustrates a system configured to apply speech impaired messages to a neural network audio filter to identify and remove impaired sections, thereby forming an unimpaired message, in accordance with embodiments herein.

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

In accordance with embodiments herein, methods, devices and computer program products are provided that utilize audio analysis and neural networks to create an audio filter algorithm. The audio filter is configured to evaluate an audio message and remove speech impairments (e.g., stutter) from the message in order to make it easier for a recipient of the message to understand the message.

In accordance with embodiments herein, methods, devices and computer program products are provided that afford the opportunity to make a message understandable that was otherwise not understandable, creating new possibilities in, among other places, education, business, healthcare, senior-care and the like. Embodiments herein afford an opportunity for a person who has a speech impairment (e.g., fluency disorder, voice disorder, articulation disorder) to work at any position that requires verbal communication (e.g., a call center) and more generally participate in business, family and/or social gatherings/meetings in a more understandable fashion. Embodiments herein enable an opportunity for people who may be born with or develop a speech impairment (e.g., due to a stroke or other health condition) to communicate in a normal manner with family and friends. Embodiments herein enable an opportunity for young people who have a speech impairment to communicate with teachers, fellow students, friends and others at an early age (e.g., young children who are born with or develop a lisp, stutter, Down Syndrome).

TERMS

The terms "neural network" and "machine learning" refer to an artificial intelligence algorithm that learns from various automatic or manual feedback, such as observations and/or data. The neural network algorithm is adjusted over multiple iterations based on the observations and/or data. For example, the neural network algorithm is adjusted by supervised learning, unsupervised learning, and/or reinforcement learning (e.g., customer feedback). Non-limiting examples of neural network algorithms are a decision tree, K-means, deep learning, artificial neural network, and/or the like.

The term "grapheme" shall mean a word sub-unit such as a letter of the alphabet or any other individual audible symbol in a writing system which represents the smallest contrastive linguistic unit which may bring about a change of meaning.

The term "speech impairment" shall mean an impairment that prevents a person from speaking in a regular tone of voice or tempo. Speech impairments make it hard for people to communicate properly and can happen in both children and adults. The term speech impairment shall include speech, in which sound or words are distorted or left out completely from a word or phrase. There are three general categories of speech impairment: fluency disorder (e.g., an unusual repetition of sounds or rhythm), voice disorder (e.g., an atypical tone of voice, unusual pitch, quality, resonance, or volume), articulation disorder (e.g., tendency to distort certain sounds, or fully omit sounds). Stuttering, or stammering, is one example of a fluency disorder. Examples of speech impairments include health related impairments (e.g., due to trauma, after a medical event/disease like a stroke, dementia, head trauma, transient ischemic attack (TIA), brain tumor, Alzheimer and the like), aphasia, dysphasia, childhood apraxia of speech, dysarthria, orofacial myofunctional disorders (OMD), speech sound disorders, stuttering, voice disorder.

The term "unimpaired" shall refer to messages that have been modified by the neural network audio filters described herein to at least partially correct a speech impairment. It is recognized that an unimpaired message is not necessarily 100% perfect in grammar, tone, tempo and the like. An unimpaired message may still include slight inaccuracies.

FIG. 1A illustrates a system 100 configured to apply speech impaired messages to a neural network audio filter to identify and remove impaired sections, thereby forming an unimpaired message, in accordance with embodiments herein. The system may include a single electronic device that implements all of the operations and structures described herein. Additionally, or alternatively, the system 100 will includes one or more of the illustrated electronic devices 110 that may be utilized to collect electronic audio signals individually or in combination with one another, and/or to analyze, modify and output unimpaired messages. The electronic devices 110 communicate with one another wirelessly through network 112. Optionally, the electronic devices 110 may communicate through a wholly or partially wired subsystem. The network 112 may represent the World Wide Web, a local area network, a wide area network and the like. The electronic devices 110 may represent various types of electronic devices including, but not limited to, smart phones, desktop or laptop computers, tablet devices, smart TVs, fixed cameras, portable or handheld cameras, recording devices, digital personal assistant (DPA) devices and the like. In addition, the electronic devices 110 may represent various types of devices configured to record audio.

At least one of the electronic devices 110 may be configured to collect an electronic audio signal comprising a speech impaired message. The electronic device 110 includes one or more processors 114, memory 116, a display 118, a user interface 120, a network communications interface 122, and various other mechanical components, electrical circuits, hardware and software to support operation of the client device 110. It is recognized that not all electronic devices 110 include a display, user interface, and the like. For example, a fixed or handheld camera may simply include camera related electronics and network circuitry to support communication to and from the camera.

The user interface 120 may include a variety of visual, audio, and/or mechanical devices. For example, the user interface 120 can include a visual input device such as an optical sensor or camera, an audio input device such as a microphone, and a mechanical input device such as a keyboard, keypad, selection hard and/or soft buttons, switch, touchpad, touch screen, icons on a touch screen, touch sensitive areas on a touch sensitive screen and/or any combination thereof. Similarly, the user interface 120 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. As further examples, the user interface 120 may include a touch sensitive screen, a non-touch sensitive screen, a text-only display, a smart phone display, an audio output (e.g., a speaker or headphone jack), and/or any combination thereof. The user interface 120 permits the user to select one or more of a switch, button or icon in connection with various operations of the device 110.

The memory 116 may include one or more memory devices of any of a variety of forms (e.g., read only memory, random access memory, static random access memory, dynamic random access memory, etc.) and can be used by the processor 114 to store and retrieve data. The data that is stored by the memory 116 can include, but need not be limited to, operating systems, applications, and other information. Each operating system includes executable code that controls basic functions of the communication device, such as interaction among the various components, communication with external devices via wireless transceivers and/or component interface, and storage and retrieval of applications and data to and from the memory 116. Each application includes executable code that utilizes an operating system to provide more specific functionality for the communication devices, such as file system service and handling of protected and unprotected data stored in the memory 116.

The network communications interface 122 provides a direct connection to other devices, auxiliary components, or accessories for additional or enhanced functionality and in particular, can include a USB port for linking to a user device with a USB cable. Optionally, the network communications interface 122 may include one or more transceivers that utilize a known wireless technology for communication.

The electronic device 110 includes one or more cameras 111 and a microphone 113. The one or more cameras 111 are configured to capture still and/or video data regarding an environment surrounding the electronic device, including, but not limited to, gestures that may be made by a user while speaking. The microphone 113 is configured to capture an electronic audio signal from a user of the electronic device 110.

The memory 116 includes, among other things, a neural network (NN) audio filter (NNAF) 126. The functionality of the NN audio filter 126 is described below in more detail. The NN audio filter 126 analyzes the electronic audio signals to segment the audio signals into segments for successive time steps. The NN audio filter 126 further groups the segments into labels corresponding to one or more word sub-units and compares successive labels (e.g., successive or groups of one or more word sub-units) in search of inappropriate repetition. The NN audio filter 126 identifies and removes impaired sections within the audio segment to form an unimpaired message, and output of the unimpaired message, through various output mechanisms (e.g., stores the end message in local or remote memory, wirelessly transmits the unimpaired message to another device, plays the unimpaired message over a speaker or other audio output).

In the foregoing example, the electronic device 110 implements the NN audio filter 126 locally on a device that may be generally present within the physical area of a user. For example, the electronic device 110 may represent the user's cell phone, laptop computer, tablet device, DPA device and the like. Additionally, or alternatively, all or portions of the NN audio filter may be implemented remotely on a remote resource, denoted in FIG. 1 as a remote processing unit 102. The remote processing unit 102 may perform limited operations, such as manage storage and creation of NN audio filters. The remote processing unit 102 communicates with electronic devices 110 through one or more networks 112 to provide access to various information such as updates to NN audio filters, updates to FOIs, feature detectors and the like. The remote processing unit 102 may represent a server or other network-based computing environment. The remote processing unit 102 may represent a single computer system or a collection of computer systems located at a common location or geographically distributed.

The remote processing unit 102 includes one or more processors 104 and memory 106, among other structures that support operation of the remote processing unit 102. In accordance with embodiments herein, the remote processing unit 102 receives requests from various electronic devices 110 and returns resources in connection there with. It is recognized that the instruction remote processing unit 102 performs other operations, not described herein, such as operations associated with maintaining resources and the like.

Figure 1B:
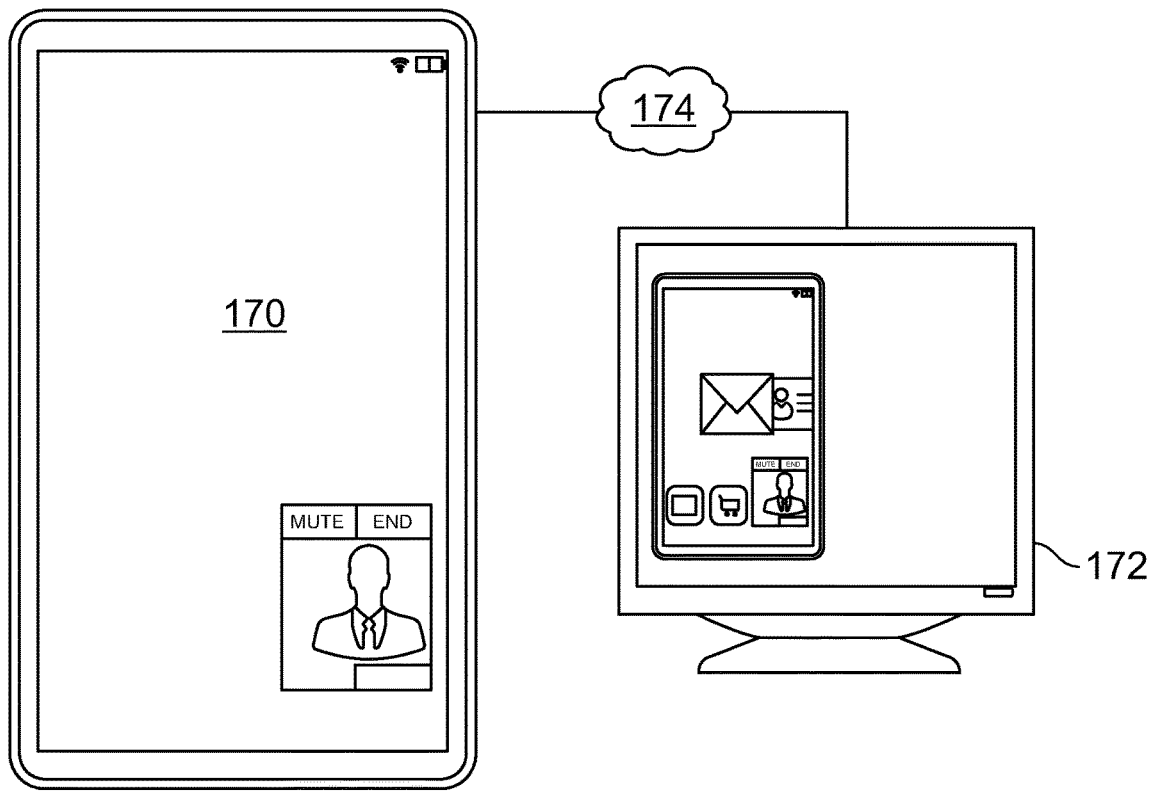
FIG. 1B illustrates an example of a use-case implemented in accordance with embodiments herein.

The memory 150 may store a collection of NN audio filters 152 organized in various manners and related to a wide variety of speech impairments, languages, dialect and the like. The collection of NN audio filters 152 may be organized and maintained within any manner of data sources, such as data bases, text files, data structures, libraries, relational files, flat files and the like. The collection of NN audio filters 152 may include various types of templates corresponding to different types of speech impairments. FIG. 1B illustrates an example of a use-case implemented in accordance with embodiments herein. The example of FIG. 1B illustrates a system implementing a software package to provide audio/video communication between two users at remote locations from one another. One electronic device is a smart phone 170, while the other electronic device is a desktop computer 172. One or both of the smart phone 170 and desktop computer 172 include memory configured to store program instructions and a NN audio filter, as well as one or more processors configured to execute the program instructions and NN audio filter. For example, a user who has a speech impairment may download a "speech correction" application to a smart phone 170. When the user speaks into the smart phone 170, the microphone within the smart phone 170 records an electronic audio signal comprising the one or more user speech impaired messages. Under direction of the one or more processors executing the program instructions, the audio signal is applied to the NN audio filter (on the smart phone 170) to modify the speech impaired message and form an unimpaired message. The unimpaired message is then output over a network 174 to the desktop computer 172. The unimpaired message is played back at the computer 172 to a recipient of the message. Additionally or alternatively, the NN audio filter may be installed on the desktop computer 172 and similar operations may be performed in the reverse direction, namely from the desktop computer to the smart phone 170. In the present example, the user of the smart phone 170 (and/or desktop computer) may be engages in a business meeting, personal audio-only call, audio/video call, school class, and the like. Optionally, the user of the smart phone 170 (and/or desktop computer) may be working at a call center, police/fire/medical/security emergency hot-line, or other audio-line based service.

Figure 1C:
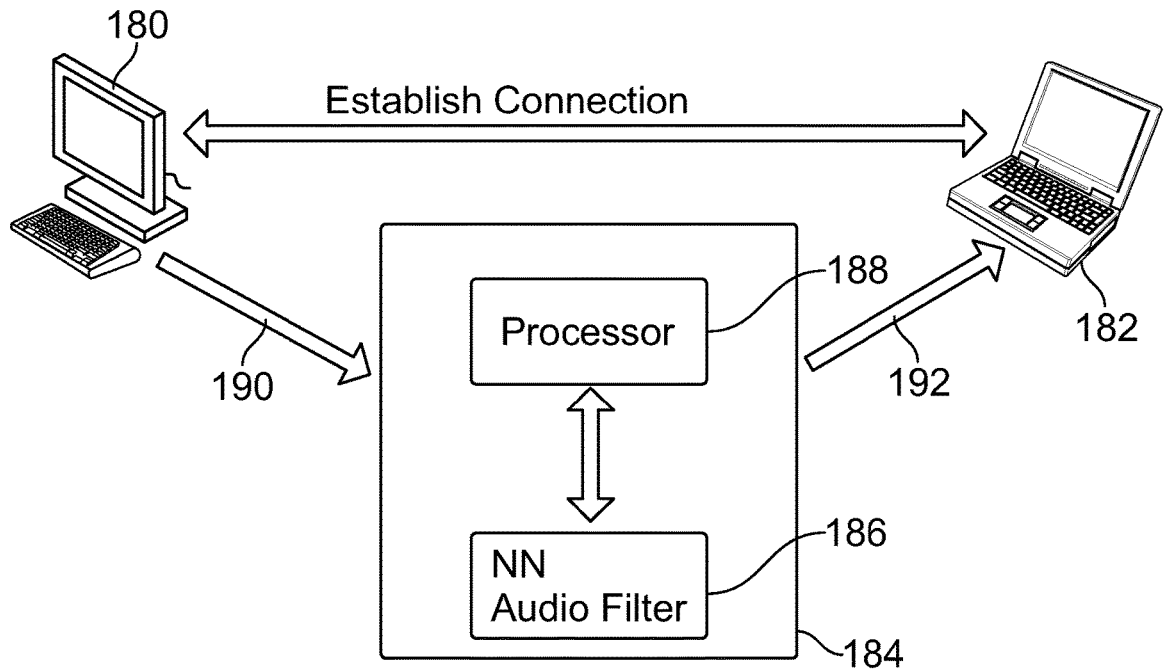
FIG. 1C illustrates an example of a use-case implemented in accordance with embodiments herein.

FIG. 1C illustrates an example of a use-case implemented in accordance with embodiments herein. In the example of FIG. 1C, first and second electronic devices 180, 182 establish and maintain a communications session with one another (e.g., audio only or audio/video). The electronic devices 180, 182 include user interfaces, memory and one or more processors that are configured to implement one or more communications platforms that support audio-only and/or audio/video communication (e.g., teleconferencing). The electronic devices 180, 182 do not directly implement the NN audio filter locally.

The NN audio filter is implemented on a network resource 184. The network resource 184 is provided with memory 186 that stores one or more NN audio filters and one or more processors 188. The one or more processors 188, when executing the program instructions, are configured to obtain an electronic audio signal comprising a speech impaired message. For example, the audio signal may be recorded at the electronic device 180 (or vice versa) and conveyed over a network (as noted at 190) to the network resource 184. The one or more processors 188 apply the audio signal to the NN audio filter to modify the speech impaired message and form an unimpaired message. The unimpaired message is output over the network (as noted at 192) to the recipient electronic device 182.

Optionally, the network resource 184 may return the unimpaired message to the source electronic device (e.g., 180) and/or transmit the unimpaired message to another electronic device (e.g., 182).

Figure 2:
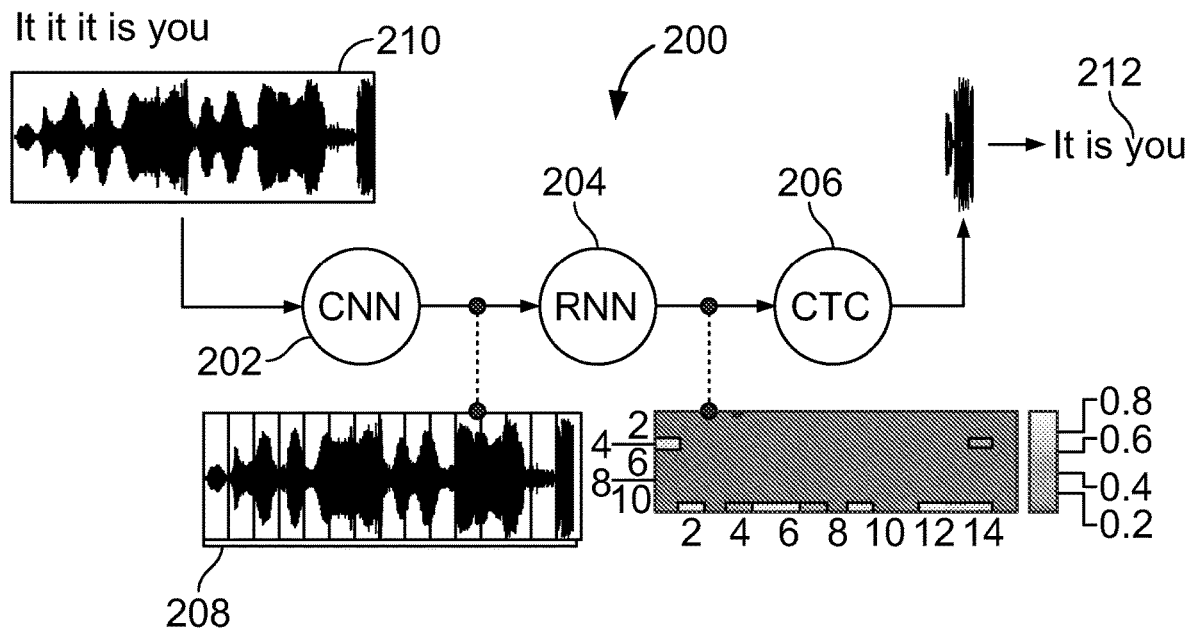
FIG. 2 illustrates a model for a neural network (NN) audio filter formed in accordance with embodiments herein.

FIG. 2 illustrates a model for a neural network (NN) audio filter formed in accordance with embodiments herein. The NN audio filter 200 includes a convolutional neural network (CNN) 202 that communicates with a recurrent neural network (RNN) 204 that communicates with a connectionist temporal classification (CTC) 206. The CNN 202 receives an electronic audio signal 210 comprising a speech impaired message. In the present example, the speech impaired message represents a stuttered message, namely "it it it is you". The audio signal 210 may be collected by an audio source, such as a microphone, while a user is speaking in real time. Additionally, or alternatively, the audio signal 210 may represent an audio file stored in memory on the local electronic device and/or on a remote electronic device. Additionally, or alternatively, the audio signal 210 may be provided within a wired or wireless communication between local electronic device and a network resource, where the local electronic device records the audio signal in real-time and transmits the audio signal over a network to a network resource that implements an NN audio filter. The network resource may return the unimpaired message to the source electronic device and/or transmit the unimpaired message to another electronic device.

The NN audio filter 200 segments the audio signal 210 into segments (e.g., elements) corresponding to successive time steps 208. The time steps have an interval of desired duration, such as an interval between 0.05 and 1.0 seconds in duration, and more specifically an interval between 0.1 and 0.3 seconds in duration. Additionally, or alternatively, the duration of the time step 208 may be chosen based on the nature of the speech impairment. For example, the time steps 208 may be shorter, in accordance with the duration of a letter or syllable for NN audio filters 200 that are configured to assist individuals who stutter. The time steps 208 may be longer, in accordance with the duration of a word or phrase for NN audio filters 200 that are configured to assist individuals who slur or otherwise draw-out words.

As explained herein, the NN audio filter 200 groups the segments into at least first and second labels across corresponding first and second collections of the time steps. The NN audio filter 200 compares the first and second labels to identify repetition, and in connection with identifying repetition, removes the segments corresponding to one of the first and second labels.

The CNN 202 comprises convolutional layers configured to extract one or more features of interest (FOIs) from each segment of the audio signal 210. By way of example, the features of interest may represent frequency FOIs within a corresponding segment. For example, a frequency FOI may represent a peak amplitude at one or more frequencies and/or an energy content (e.g., "area under the curve") within one or more frequency ranges. The FOIs may be tailored to facilitate identification of syllables, letters and/or words in a language of interest.

As one non-limiting example, the CNN 202 may utilize feature detectors, such as kernels or filters, that have varied levels of complexity. The feature detectors are applied to or "moved across" the segments within corresponding time steps 208 of the audio signals 210 for the speech impaired message. As one example, the CNN 202 applies, among other things, correlation analysis to determine an extent to which the audio signal 210 corresponds to a given feature detector. For example, when the FOI corresponds to a frequency FOI, the feature detector may represent a frequency detector. For example, the frequency detector may designate amplitude thresholds for certain frequencies, a total frequency content within certain frequency ranges, a shape of a frequency content plot over a frequency range of interest and the like. Additionally, or alternatively, combinations of frequency detectors may be utilized, such as a total frequency content within first and second frequency ranges, a shape of the frequency content over a third frequency range alone or in combination with amplitude thresholds for fourth and fifth frequencies.

The process may be repeated for one or more feature detectors in connection with a current segment to determine when/whether the audio signal 210 for the current time step 208 includes a given FOI. For example, a frequency FOI (or set of frequency FOIs) may be defined to correspond to a letter, syllable or word (e.g., "a", "ah", "it"). The CNN 202 output a sequence of FOIs, where each feature or subsequence of features corresponds to one time step 208 of the audio signal 210. In the example of FIG. 2, the input signal 210 corresponds to the speech impaired message "it it it is you". In connection therewith, the CNN 202 may output a sequence of FOIs designating a separate element (e.g., letter or sound) for each time step. For example, the sequence may include the following series of elements "ih", "t", "ih", "t", "ih", "t", "ih", "s", and "you".

The sequence of FOIs is provided to the RNN 204. The RNN 204 is configured to output values scores for each corresponding element of the sequence FOI. As one example, the values scores may be presented in a matrix, where each row of the matrix corresponds to a different element and each column corresponds to a time-step along the speech impaired message. The RNN 204 takes information from prior inputs to influence the current input and output. While traditional deep neural networks assume that inputs and outputs are independent of each other, the output of the RNN 204 depends on the prior elements within the sequence. The output (e.g., matrix) of the RNN 204 is provided to the CTC 206.

The CTC 206 is configured to decode the matrix to identify the sounds or words that are at least one of distorted or repeated. Additionally, or alternatively, the CTC 206 decodes the matrix to develop a histogram that includes a count of successive repetitive elements, graphemes, word sub-units and the like. For example, the histogram may indicate that a syllable or word is repeated successively an excessive number of times (e.g., "it it it", "I I I", "bu bu bu"). The number of times that a syllable, word or other word sub-unit may be repeated may be predefined and/or automatically determined based on normal grammatical usage customs (e.g., for a geographic region, demographic base, dialect, etc.). Additionally, or alternatively, the histogram may indicate that a single syllable or word is "drawn-out" or otherwise distorted over incorrect period of time (e.g., "iiinttttt", "ffffooorrr"). The degree of distortion that may occur for a syllable, word or other word sub-unit may be predefined and/or automatically determined based on normal grammatical usage customs (e.g., for a geographic region, demographic base, dialect, etc.). The CTC 206 removes the distortion and/or repetition to form the unimpaired message (as denoted at 212). In accordance with embodiments herein, the CTC 206 identifies an impaired section of the speech impaired message, the impaired section comprising sounds or words that are at least one of distorted or repeated and the CTC 206 removes the impaired section to form the unimpaired message. Additionally, or alternatively, the CTC 206 identifies, as the impaired section, a sequence of repetitive sounds or words, the sequence of repetitive sounds or words removed to form the unimpaired message.

The NN audio filter 200 may be implemented in real-time while a person is speaking. For example, the speech impaired message may be recorded at a microphone of an electronic device, while the NN audio filter simultaneously performs the segmenting, grouping, comparing and removing operations in real time.

Figure 3:
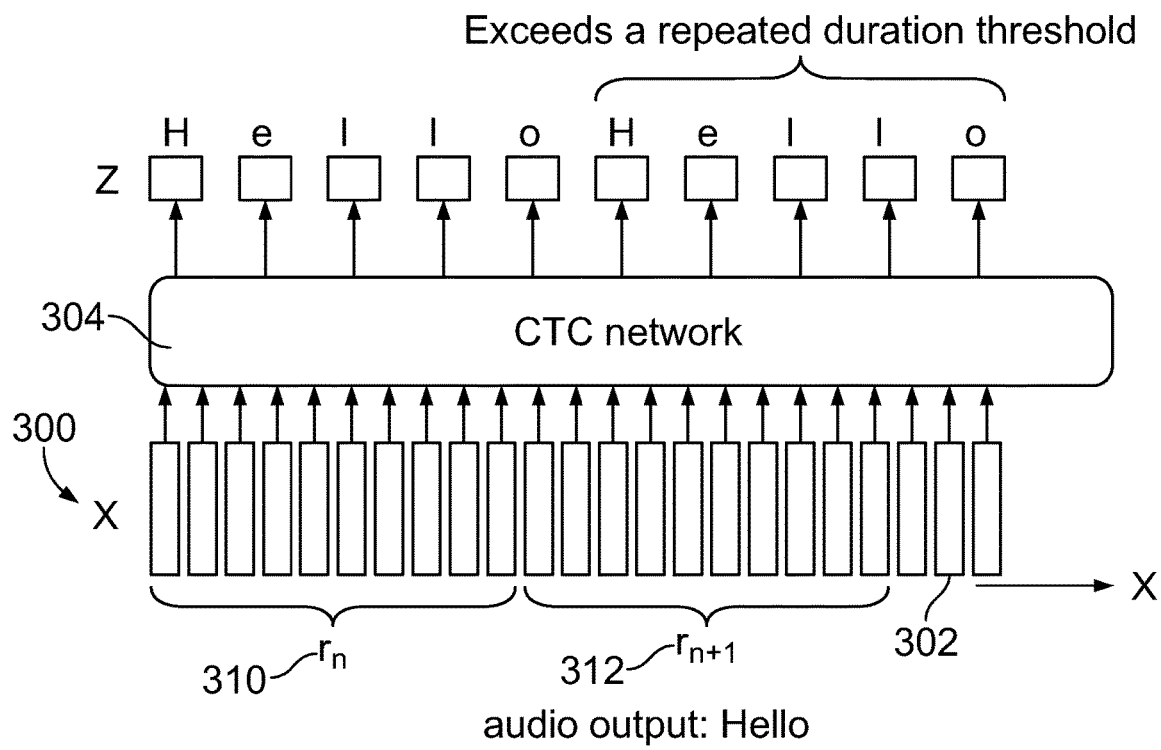
FIG. 3 illustrates a block diagram of a CTC network in accordance with embodiments herein.

FIG. 3 illustrates a block diagram of a CTC network in accordance with embodiments herein. The CTC network may be implemented in connection RNN and CNN networks, or optionally implemented without preceding CNN and/or RNN networks. By way of example, the CTC network may be implemented in accordance with an automatic speech recognition system as described and referenced in the article "FROM SPEECH TO LETTERS—USING A NOVEL NEURAL NETWORK ARCHITECTURE FOR GRAPHEME BASED ASR", Eyben et al., 2009 IEEE Workshop for Automatic Speech Recognition and Understanding, pages 376-380, the complete subject matter of which is incorporated herein by reference in its entirety.

An audio signal 300 is segmented into elements 302, each of which corresponds to a time step. The CTC 304 is implemented as a K-length CTC state sequence composed of the original grapheme set and repeated label. In the example of FIG. 3, the original grapheme set is "hello hello". The variable $r_n$='n' are the labels 310, 312 (collections of elements) of varying size 'r'. In the present example, the variable $r_n$ represents a first label or collection of elements 310 (corresponding to time steps), along a time window T that is compared with $r_{n+1}$, a second label or collection of elements 312 along the same time window 't'. As shown in FIG. 3, the first and second labels 310, 312 are arranged in a nonoverlapping manner. In the present example, the size of the first and second labels 310, 312 includes 10 elements, corresponding to 10 time steps. However, it is recognized that the size 'r' of the first and second labels 310, 312 may be varied based on numerous criteria, such as the nature of the speech impairment and the like. Also, it should be recognized that an element or time step does not necessarily correspond to a letter, syllable or word. In the present example, 10 elements/time steps correspond to all or a portion of the word "hello". The CTC network determines that the label 310 (corresponding to the word "hello") is repeated at the label 312, namely $r_n = r_{n+1}$, thereby identifying an impaired portion that includes the stuttering phrase "hello hello". Accordingly, the CTC 304 removes the impaired section to form the unimpaired message.

Figure 4:
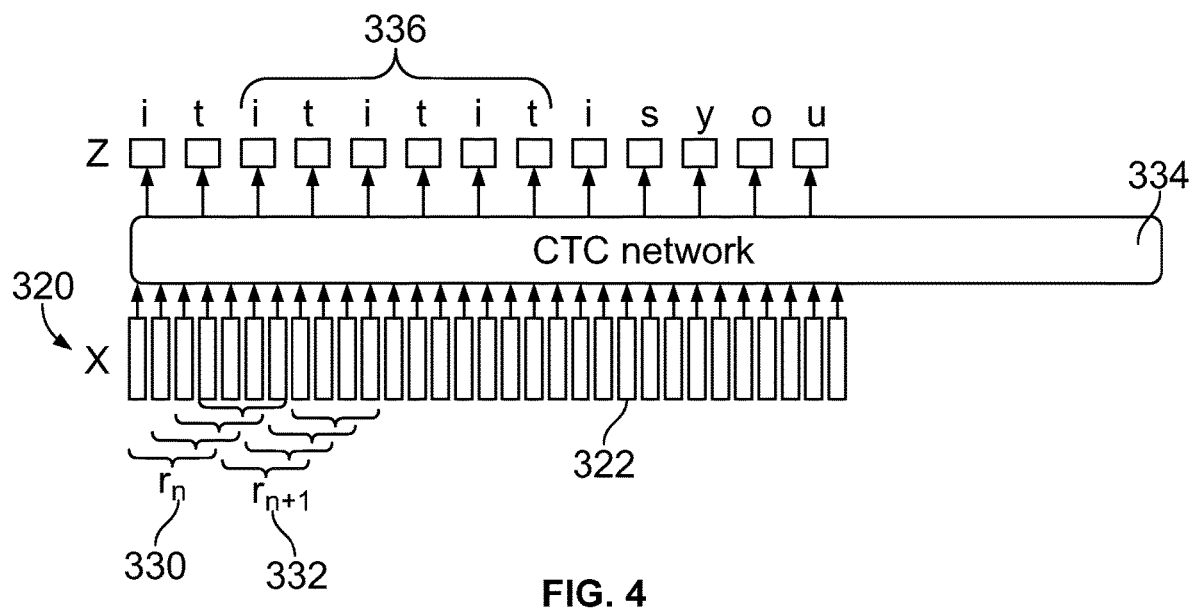
FIG. 4 illustrates an alternative example of a CTC network in accordance with embodiments herein.

FIG. 4 illustrates an example of a CTC network, resembling the embodiment of FIG. 3, except that the label size 'r' includes 4 elements, not 10 elements. An audio signal 320 is segmented into elements 322, each of which corresponds to a time step. The CTC 334 is implemented as a K-length CTC state sequence. In the present example, the variable $r_n$ represents the first label 330 of 4 elements that is compared with $r_{n+1}$1, the second label 332 of 4 elements along the same time window 't'. As shown in FIG. 4, the first and second labels 330, 332 are arranged in a nonoverlapping manner. The CTC network 334 successively steps one or more elements forward in time along the audio signal 320, to compare successive new combinations of first and second labels with one another. In the present example, the speech impaired message includes the phrase "it it it it is you". The CTC network 334 identifies the impaired speech section 336, which represents grammatically incorrect repetition of the word "it". The CTC network 334 removes the impaired speech section 336 (e.g., "it it it") to form an unimpaired message "it is you".

Figure 5:
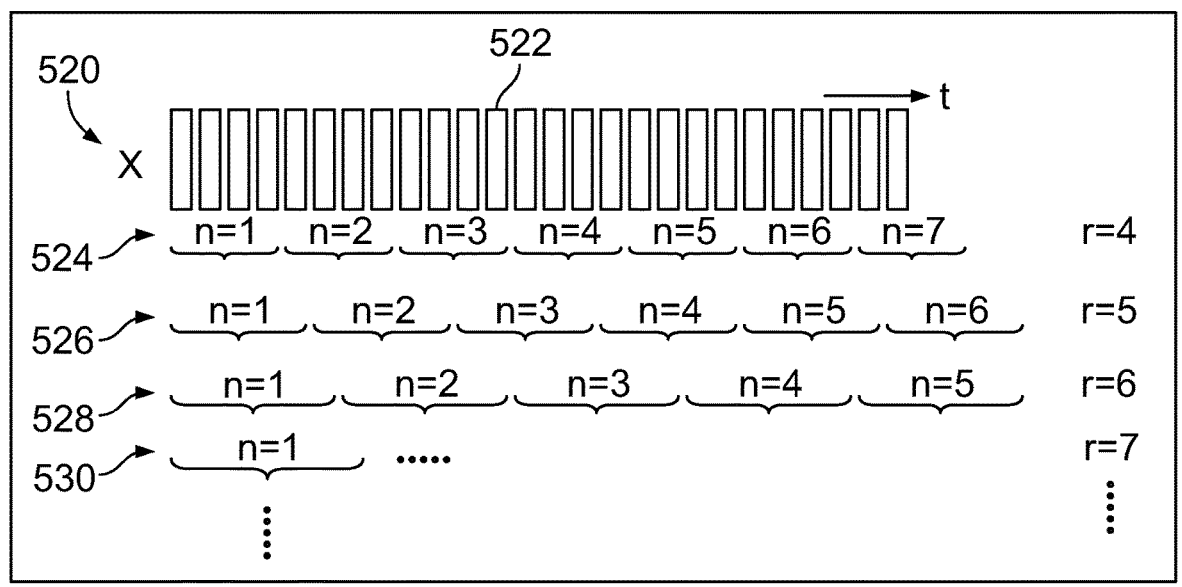
FIG. 5 illustrates examples of various labels that may be applied simultaneously, in accordance with embodiments herein.

FIG. 5 illustrates examples of various labels that may be applied simultaneously, in accordance with embodiments herein. An audio signal 520 is apportioned into segments 522. One or more CTC networks apply labels of the differing size. For example, a first series of labels 524 may be defined, with each of the labels 524 grouping 4 segments into a single label. Simultaneously, a second series of labels 526 may be defined, with each of the labels 526 grouping 5 segments into a single label. Simultaneously, a third series of labels 528 may be defined, with each of the labels 528 grouping 6 segments into a single label. Simultaneously, a fourth series of labels 530 may be defined, with each of the labels 530 grouping 7 segments into a single label. The series of labels 524-530 are simultaneously traversed across the audio signal to compare corresponding collections of elements with one another in search of repetition or omission of word sub-units, phrases and the like.

Figure 6:
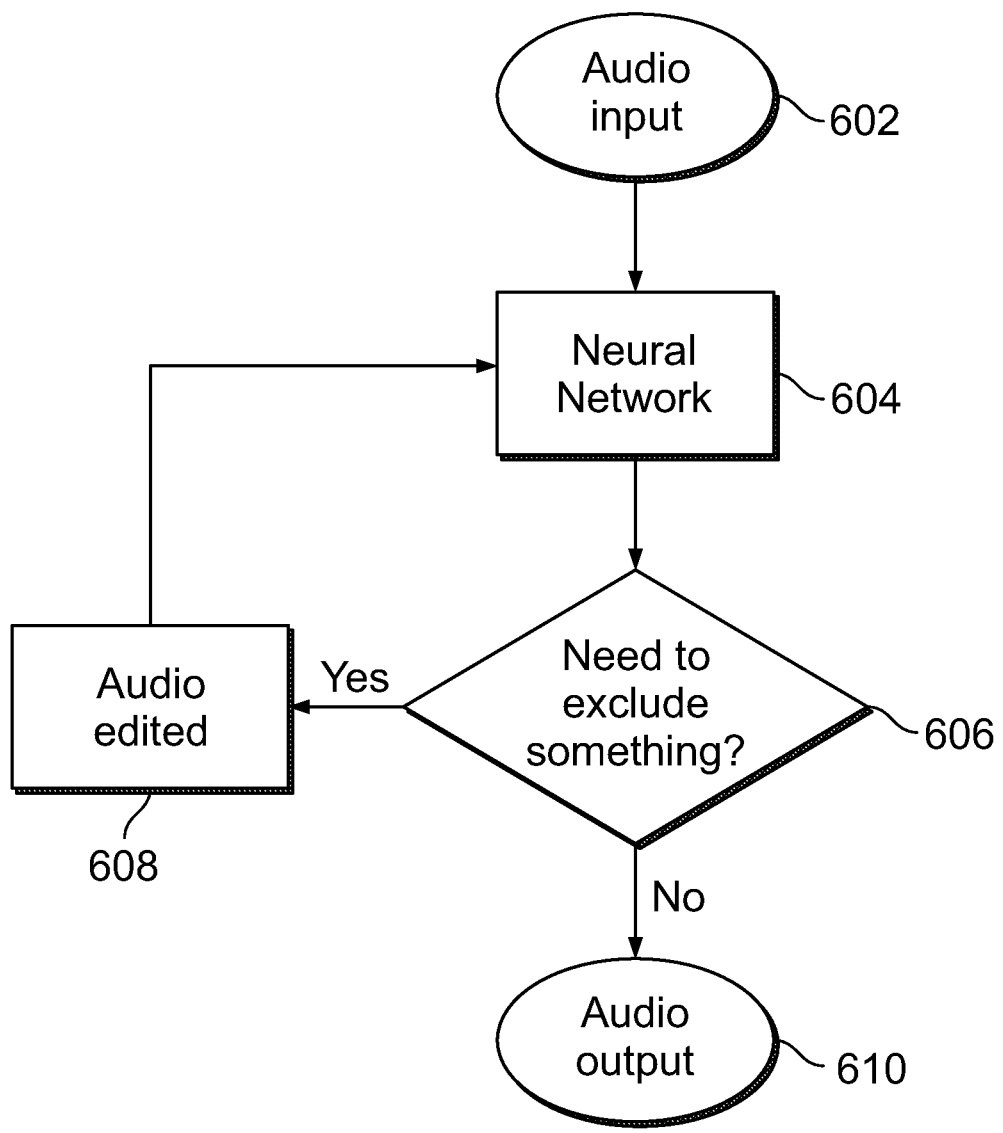
FIG. 6 illustrates a process implemented in accordance with embodiments herein.

FIG. 6 illustrates a process implemented in accordance with embodiments herein. At 602, one or more processors of an electronic device obtains an electronic audio signal comprising a speech impaired message. At 604, the one or more processors apply the audio signal to the NN audio filter. As explained herein, under the direction of the one or more processors, the NN audio filter determines whether one or more impaired sections are present within the audio signal. At 606, under the direction of the one or more processors, the NN audio filter determines whether one or more impaired sections are present. For example, the process determines whether one or more word sub-units are improperly repeated. When an impaired section is identified, flow moves to 608. At 608, the one or more processors edit the audio signal to remove the impaired section or sections. Thereafter, flow returns to the NN audio filter, where the NN audio filter analyzes a next portion of the audio signal for additional impaired sections. When the complete audio signals been analyzed and no further impaired sections are identified, flow moves from 606 to 610. At 610, the one or more processors output the unimpaired message.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally, or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Further, in the following claims, the phrases "at least A or B", "A and/or B", and "one or more of A and B" (where "A" and "B" represent claim elements), are used to encompass i) A, ii) B and/or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method to be implemented by a system including memory configured to store program instructions and a neural network (NN) audio filter that includes a connectionist temporal classification (CTC), the system further including one or more processors configured to execute the program instructions, the method comprising:
    obtaining, at the system, an electronic audio signal comprising a speech impaired message;
    under direction of the one or more processors executing the program instructions, applying the electronic audio signal to the NN audio filter for the CTC to identify an impaired section of the electronic audio signal and modify the electronic audio signal by removing the impaired section thereof to form an unimpaired message; and
    outputting the unimpaired message.

2. The method of claim 1, wherein the impaired section comprises sounds or words that are at least one of distorted or repeated.

3. The method of claim 2, further comprising identifying, as the impaired section, a sequence of repetitive sounds or words, the sequence of repetitive sounds or words removed to form the unimpaired message.

4. The method of claim 1, wherein the applying the NN audio filter further comprises: segmenting the electronic audio signal into segments corresponding to time steps; grouping the segments into first and second labels across corresponding first and second collections of the time steps; comparing the first and second labels to identify repetition; and in connection with identifying repetition, removing the segments corresponding to one of the first and second labels.

5. The method of claim 4, wherein the obtaining includes recording the speech impaired message at a microphone of an electronic device, and wherein the NN audio filter performs the segmenting, grouping, comparing and removing operations in real time while recording the speech impaired message.

6. The method of claim 1, wherein the NN audio filter comprises a convolutional neural network (CNN) that communicates with a recurrent neural network (RNN), and the RNN communicates with the CTC.

7. The method of claim 1, further comprising utilizing feature detectors to extract one or more features of interest (FOIs) from segments of the electronic audio signal, identifying word sub-units from the segments, grouping the word sub-units into labels, comparing the labels to identify the impaired section, and removing the word sub-units corresponding to the impaired section to form the unimpaired message.

8. A system, comprising:
    a user interface;
    memory configured to store program instructions and a neural network (NN) audio filter that includes a connectionist temporal classification (CTC); and
    one or more processors that, when executing the program instructions, are configured to:
        obtain, at the electronic device, an electronic audio signal comprising a speech impaired message;
        apply the electronic audio signal to the NN audio filter for the CTC to identify an impaired section of the electronic audio signal and modify the electronic audio signal by removing the impaired section thereof to form an unimpaired message; and
    output the unimpaired message.

9. The system of claim 8, wherein the one or more processors are configured to identify the impaired section as comprising sounds or words that are at least one of distorted or repeated.

10. The system of claim 9, wherein the one or more processors are further configured to identify, as the impaired section, a sequence of repetitive sounds or words and remove the sequence of repetitive sounds or words to form the unimpaired message.

11. The system of claim 8, wherein the one or more processors are further configured to apply the NN audio filter by: segmenting the electronic audio signal into segments corresponding to time steps; grouping the segments into first and second labels across corresponding first and second collections of the time steps; comparing the first and second labels to identify repetition; and in connection with identifying repetition, removing the segments corresponding to one of the first and second labels.

12. The system of claim 11, further comprising a portable handheld device that includes the user interface, memory, one or more processors and a microphone, the microphone configured to record the speech impaired message, the one or more processors of the handheld device configured to apply the NN audio filter to perform the segmenting, grouping, comparing and removing operations in real time while the microphone records the speech impaired message.

13. The system of claim 8, wherein the one or more processors, when applying the electronic audio signal to the NN audio filter, are further configured to:
utilize feature detectors to extract one or more features of interest (FOIs) from segments of the electronic audio signal;
identify word sub-units from the segments;
group the word sub-units into labels;
compare the labels to identify the impaired section; and
remove the word sub-units corresponding to the impaired section to form the unimpaired message.

14. The system of claim 8, wherein the one or more processors are further configured to output the unimpaired message by at least one of: i) replaying the unimpaired message over an audio speaker, ii) transmitting the unimpaired message wired or wirelessly over a network, iii) presenting the unimpaired message on a display as a text message, iv) recording the unimpaired message in the memory on a local electronic device or a remote resource.

15. The system of claim 8, wherein the NN audio filter comprises a convolutional neural network (CNN) that communicates with a recurrent neural network (RNN), and the RNN communicates with the CTC.

16. The system of claim 15, wherein the CNN receives the electronic audio signal and extracts a sequence of one or more features of interest (FOIs) from segments of the electronic audio signal, the RNN configured to receive the sequence of one or more FOIs and output value scores for each corresponding element of the sequence of one or more FOIs, the value scores presented in a matrix, the CTC configured to decode the matrix to identify sounds or words that are at least one of distorted or repeated, and identify the impaired section to include the sounds or words that are at least one of distorted or repeated.

17. A computer program product comprising a non-signal computer readable storage medium comprising computer executable code to perform:
obtaining an electronic audio signal comprising a speech impaired message;
applying the electronic audio signal to a neural network (NN) audio filter that includes a connectionist temporal classification (CTC), the computer executable code applies the NN audio filter by utilizing the CTC to identify an impaired section of the electronic audio signal and modify the electronic audio signal by removing the impaired section thereof to form an unimpaired message; and
outputting the unimpaired message.

18. The computer program product of claim 17, wherein the computer executable code applies the NN audio filter by identifying the impaired section as comprising sounds or words that are at least one of distorted or repeated.

19. The computer program product of claim 17, wherein the computer executable code applies the NN audio filter by:
segmenting the electronic audio signal into segments corresponding to time steps;
grouping the segments into first and second labels across corresponding first and second collections of the time steps;
comparing the first and second labels to identify repetition; and
in connection with identifying repetition, removing the segments corresponding to one of the first and second labels.

20. The computer program product of claim 17, wherein the NN audio filter comprises a convolutional neural network (CNN) that communicates with a recurrent neural network (RNN), and the RNN communicates with the CTC.

* * * * *